A. MAILHIOT.
VEHICLE WHEEL.
APPLICATION FILED NOV. 5, 1921.

1,423,574.

Patented July 25, 1922.
2 SHEETS—SHEET 1.

Alexander Mailhiot
INVENTOR

BY Victor J. Evans
ATTORNEY

A. MAILHIOT.
VEHICLE WHEEL.
APPLICATION FILED NOV. 5, 1921.
1,423,574.
Patented July 25, 1922.
2 SHEETS—SHEET 2.
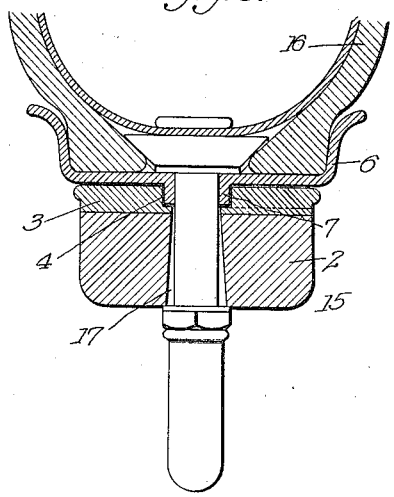
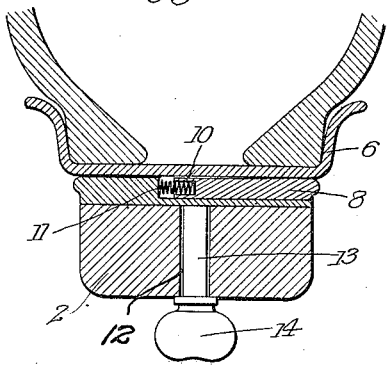
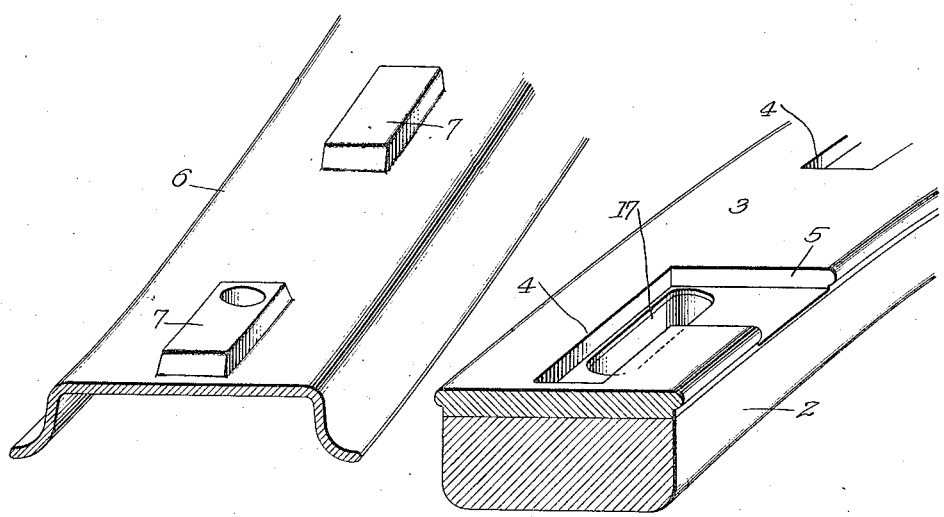
Alexander Mailhiot
INVENTOR
BY Victor J. Evans
ATTORNEY
WITNESS:

UNITED STATES PATENT OFFICE.

ALEXANDER MAILHIOT, OF THOROLD, ONTARIO, CANADA.

VEHICLE WHEEL.

1,423,574.  Specification of Letters Patent.  Patented July 25, 1922.

Application filed November 5, 1921. Serial No. 513,071.

*To all whom it may concern:*

Be it known that I, ALEXANDER MAILHIOT, a citizen of Canada, residing at Thorold, in the Province of Ontario and Dominion of Canada, have invented new and useful Improvements in Vehicle Wheels, of which the following is a specification.

My present invention has reference to a vehicle wheel.

My object is to provide the rim of a vehicle wheel with means for engaging a tire carrying rim in a manner to easily, quickly and effectively lock the tire carrying rim on the wheel rim.

A further object is to provide a wheel with a rim having longitudinally arranged peripheral grooves and notches between one face of the rim and one end of the grooves, and to produce a tire carrying rim having its inner periphery provided with lugs designed to be first passed through the notches in the wheel rim and then turned to be received in the grooves in the said rim, means, in the nature of block members being received in the notches of the tire carrying rim which are also brought into contacting engagement with the ends of the lugs on the tire carrying rim, while locking means is passed through the felly of the wheel and the rim thereon for holding the blocks in such positions and for effectively securing the tire carrying rim on the wheel rim.

A still further object is to produce a quick demountable tire carrying rim having lugs thereon to be received in grooves in a wheel rim, the said wheel rim also having notches which communicate with the grooves therein and provide entrance passages for the lugs on the vehicle wheel, the wheel rim and the felly of the wheel having a slot in alignment with one of the grooves for the reception of the valve on the pneumatic tire carried by the tire rim, while blocks are inserted in the said notches on the wheel rim and locked thereto in an easy but effective manner, said blocks having their inner ends provided with springs, whereby when the locking means is released the said blocks will automatically move out of the notches to permit of the easy withdrawal thereof and the separation of the tire carrying rim from the wheel by the turning of the said rim on the wheel to bring the lugs thereof opposite the notches of the wheel rim.

The foregoing, and other objects which will appear as the nature of the invention is better understood, may be accomplished by a construction, combination and operative association of parts, such as is disclosed by the drawings which accompany and which form part of this specification.

In the drawings:—

Figure 3 is a sectional view on the line 3—3 of Figure 1 and on an enlarged scale.

Figure 4 is a sectional view on the line 4—4 of Figure 1, also on an enlarged scale.

Figure 5 is a fragmentary perspective view of a portion of the tire carrying rim.

Figure 6 is a perspective view of a portion of the wheel and the rim thereon.

Figure 1:
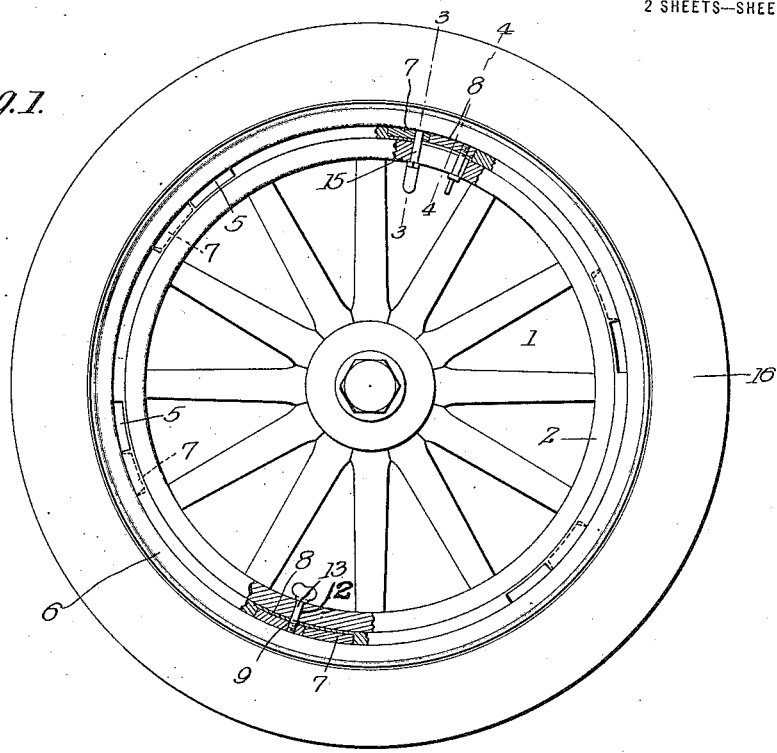
Figure 1 is a side elevation of the improvement.
Figure 2:
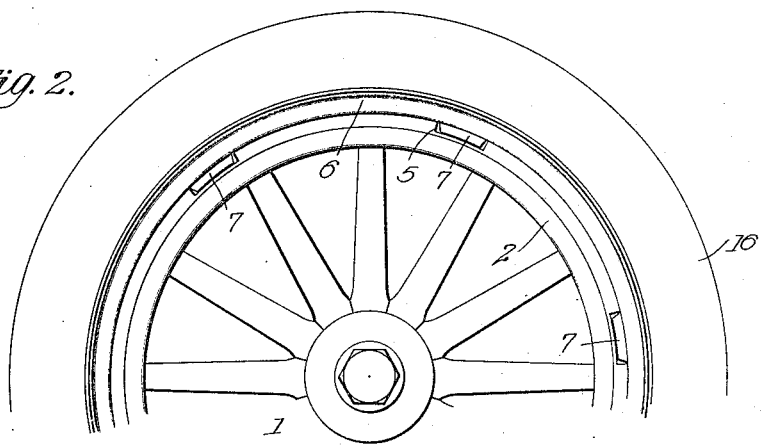
Figure 2 is a similar view but showing the tire carrying rim turned on the wheel to bring the lugs thereof in alignment with the notches on the wheel rim to permit of the removal or the arrangement of the tire carrying rim on the wheel rim.

Referring now to the drawings in detail, the numeral 1 designates a wheel for automobiles, the same being of the usual construction, having spokes radiating from the hub thereof and connected to the felly 2. On the felly 2 there is secured in any desired manner or if desired, there may be formed on the felly of the wheel a rim 3. The rim is of a width equalling that of the felly and is provided with a plurality of centrally arranged spaced peripheral grooves 4. From one side of the wheel rim, and in a line with one of the end walls of the grooves 4 there are notches 5. If desired, the walls of the grooves 4 extending from the inner wall provided by the notches 5 may be divided or one of the walls may be inclined toward the other wall.

The tire carrying rim is also of the usual construction, and is indicated by the numeral 6. The rim 6 has on its inner face centrally arranged spaced lugs 7. Preferably these lugs are wedge-shaped and the lugs are of a length to be snugly received in the notches 5 of the wheel rim and the tire carrying rim thereafter turned on the wheel rim to bring the wedge-shaped lugs in the wedge-shaped grooves. The lugs are preferably of a length equalling the distance between the inner walls of the notches 5 and the ends of the grooves so that one end of the groove will be in alignment with the inner wall of each notch. In certain of the notches, I insert blocks 8. Each block has a rounded opening 9 therethrough and has its inner wall provided with a socket 10 in which is inserted a helical spring 11. The springs 11, pressing against the inner walls of the grooves will have a tendency to force the blocks out of the grooves and out of the notches. The blocks, when arranged in the notches and in the grooves will be in contacting engagement with one of the ends of the lugs on the tire carrying rim, and the wheel rim as well as the felly of the wheel are provided with openings 12 which align with the openings in the blocks, and passing through the last mentioned openings are the stems 13 of headed members 14 which, when received in the openings in the blocks will hold the same in the pockets provided therefor.

The openings in the blocks are preferably threaded, in which instance it is not necessary that the openings in the felly and in the tire carrying rim be also threaded.

One of the lugs on the tire carrying rim is provided with an opening through which passes the valve stem 15 of the pneumatic tire 16. The wheel rim has an elongated slot 17 which extends from the bolt opening therein to receive therein the valve stem when the tire carrying rim is turned on the wheel rim. The bolt opening, in this instance may be flared from the outer to the inner surface of the wheel rim and felly so that by slightly canting the tire carrying rim the valve stem can be readily inserted through the said opening and thereafter brought into contact with the end wall provided by the elongated opening when the tire carrying rim is turned on the wheel.

It is thought that the foregoing description, when taken in connection with the drawings will fully set forth the construction, operation and advantages of the improvement and that further detailed description will not be required. It is, however, thought necessary to state that the nature of the invention is such as to render the same susceptible to changes in size, proportion, material and other details of construction, and that all such changes as fall within the scope of what I claim may be resorted to.

Having described the invention, I claim:—

In a device as herein set forth, a wheel having a rim provided with spaced peripheral grooves and having notches from one of the sides thereof entering the grooves and one of the walls of each notch being in a line with one of the end walls of each groove, and a tire carrying rim having lugs designed to be passed through the notches and turned on the wheel rim to be received in the grooves thereof, blocks in the notches in contacting engagement with one end of the lugs, and means for securing the blocks in such position, spring means carried by the blocks contacting the inner walls of the grooves for partly projecting the blocks through the notches, and means for locking the blocks when fully received in the notches.

In testimony whereof I affix my signature.

ALEXANDER MAILHIOT.